April 8, 1941.　　　　　T. C. RUSH　　　　　2,237,608
GOLF PRACTICING DEVICE
Filed Oct. 10, 1938　　　3 Sheets-Sheet 1
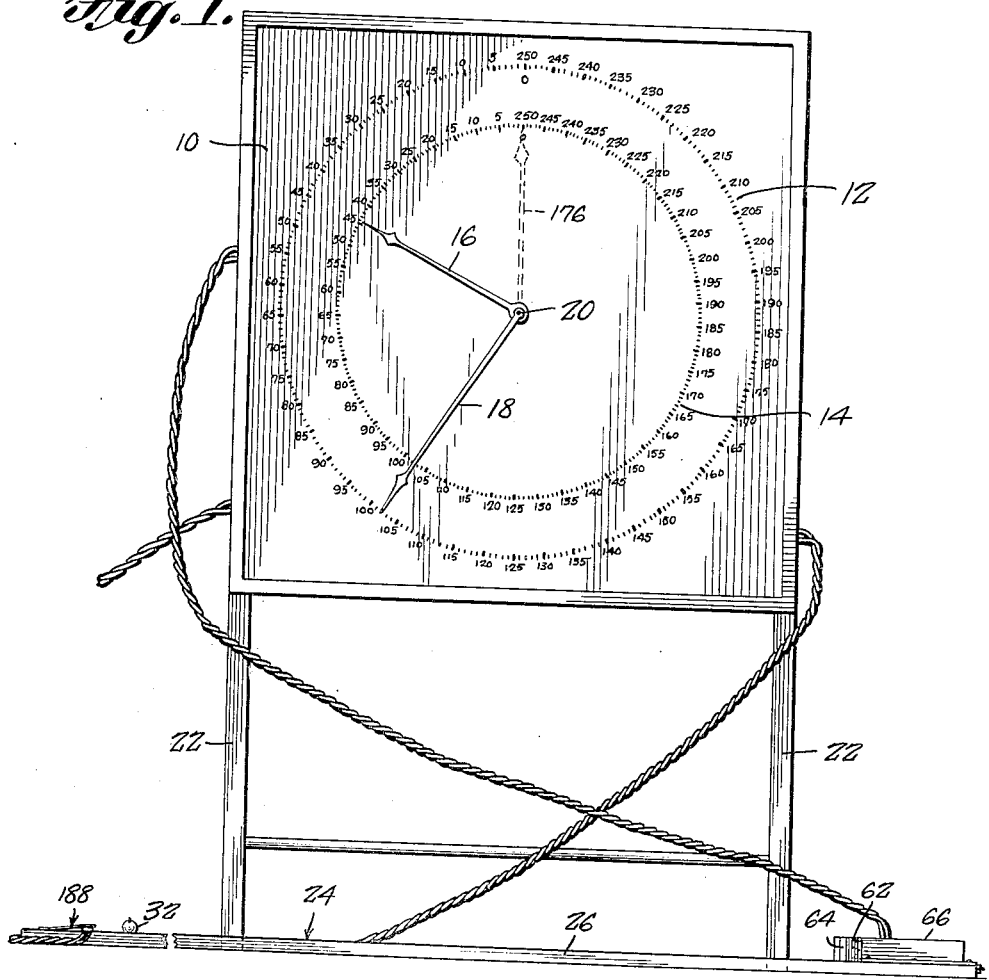
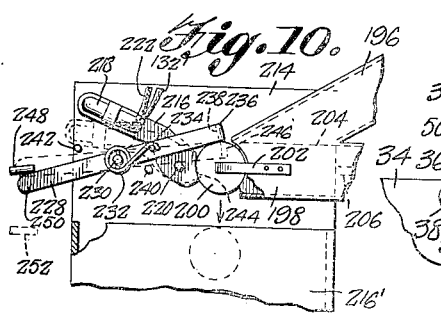
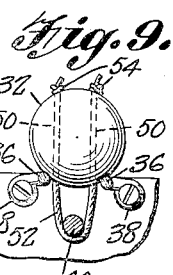
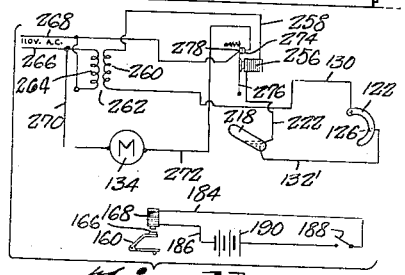
Turner C. Rush,
INVENTOR
BY Victor J. Evans & Co.
ATTORNEYS April 8, 1941.  T. C. RUSH  2,237,608
GOLF PRACTICING DEVICE
Filed Oct. 10, 1938  3 Sheets-Sheet 2

Turner C. Rush,
INVENTOR

April 8, 1941.　　　　　T. C. RUSH　　　　2,237,608
GOLF PRACTICING DEVICE
Filed Oct. 10, 1938　　　3 Sheets-Sheet 3

Turner C. Rush,
INVENTOR
BY Victor J. Evans & Co.
ATTORNEYS

WITNESS P. T. Hickey

Patented Apr. 8, 1941

2,237,608

UNITED STATES PATENT OFFICE 2,237,608

GOLF PRACTICING DEVICE

Turner C. Rush, Lexington, Ky.

Application October 10, 1938, Serial No. 234,301

4 Claims. (Cl. 194—9)

My invention relates to golf practicing devices, and has among its objects and advantages the provision of novel means for recording the force of a drive in terms of yardage.

An object of my invention is to provide a golf practicing device embodying a regulation golf ball which is driven in the usual manner, wherein novel impact means are positioned in the path of the driven ball for actuating a recording mechanism which translates the force of the drive into terms of yardage. The invention embodies a yardage recording mechanism for the individual drives as well as a totalizer for a series of drives. The recording device embodies a needle and a dial for indicating yardage of the individual drives and a needle and a dial for recording the total yardage, together with novel means for resetting the individual drive recording needle to a zero position after each drive.

In the accompanying drawings:

Figure 1 is a face view of the drive recording dials;

Figure 9 is an end view of the golf ball race;

Figure 10 is a detail view of a coin-controlled switch;

Figure 11 is a diagrammatic view of two electric circuits embodied in the invention;

Figure 2:
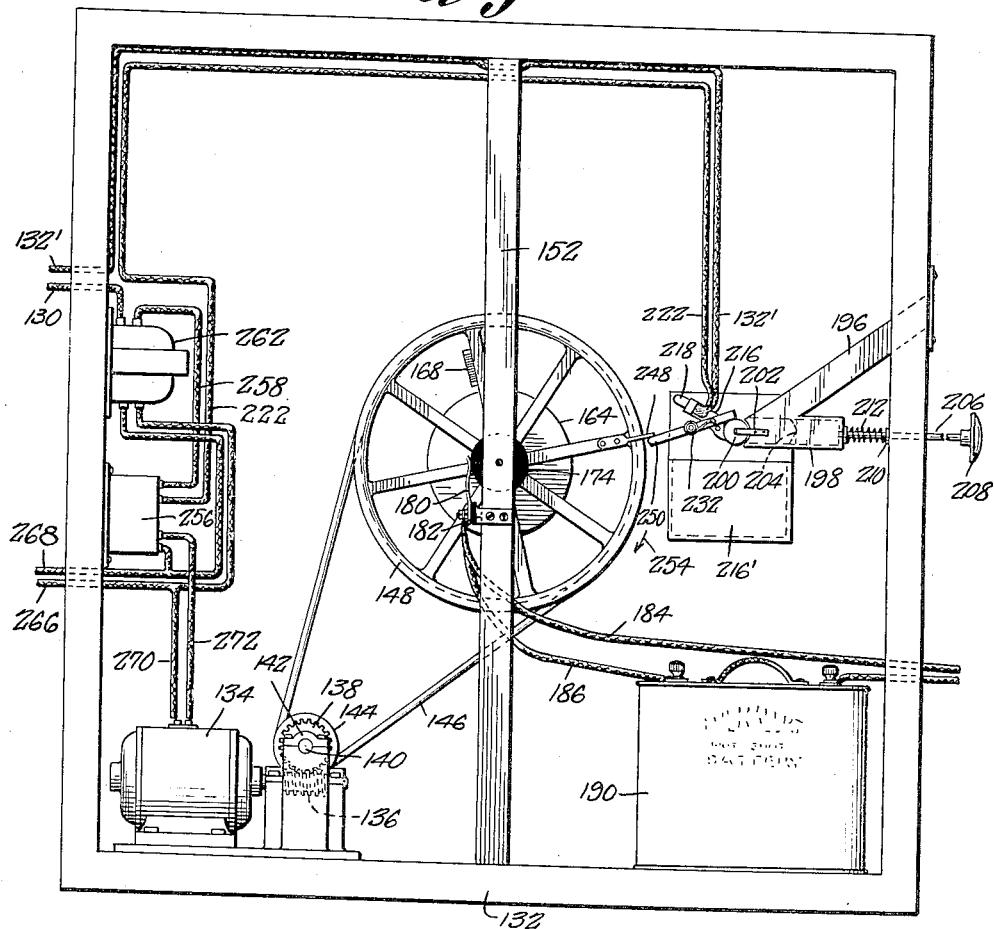
Figure 2 is a rear view of the structure illustrated in Figure 1.
Figure 3:
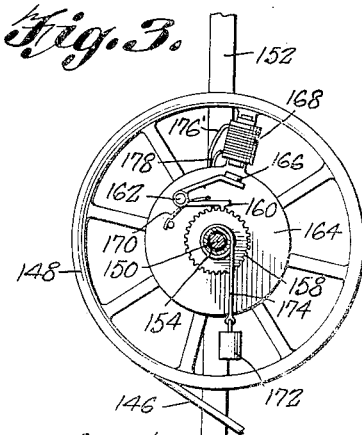
Figure 3 is an elevational view of the individual drive needle resetting mechanism.
Figure 4:
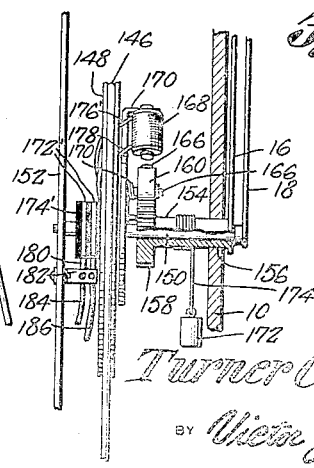
Figure 4 is a view illustrating the structure of Figure 3 rotated 90 degrees about a vertical axis.

In the embodiment selected to illustrate my invention, I make use of a panel 10 provided with a total yardage dial 12 and an individual drive yardage dial 14. The two dials are concentrically related, with the dial 12 preferably located outside the dial 14. A short needle 16 is associated with the dial 14, while a longer needle 18 is associated with the dial 12. Needles 16 and 18 are rotatable about a common axis 20.

Fig. 1 illustrates the dials 12 and 14 as reading in a counterclockwise direction, and the panel 10 as being mounted upon a suitable leg structure 22. For outside practice purposes, the legs 22 may be anchored in the ground, while for indoor practice purposes the lower ends of the legs may be connected with any suitable base structure, not shown, for balancing purposes.

Figure 5:
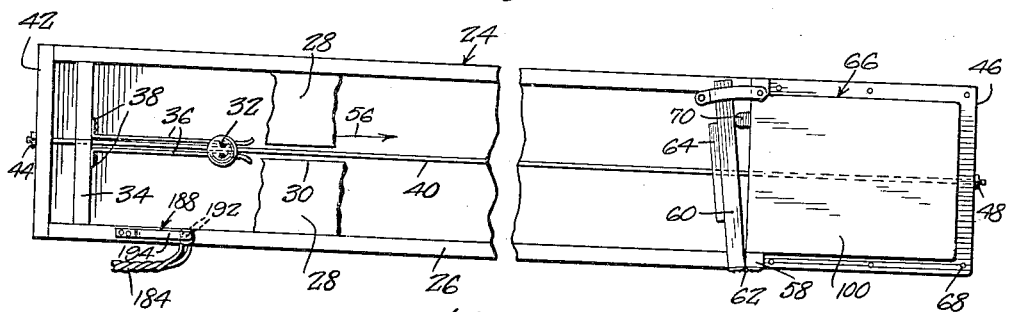
Figure 5 is a top plan view of the golf ball and its race in combination with the impact member.
Figure 12:
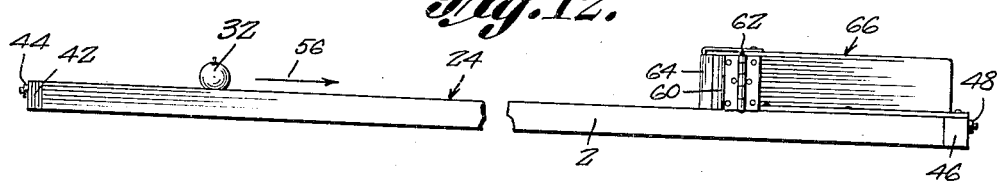
Figure 12 is a side elevational view of the structure illustrated in Figure 5.

Figs. 5, 12 and 9 illustrate the golf ball race 24. Race 24 comprises a frame 26 to which I anchor boards 28 spaced at 30 to provide a race for the regulation golf ball 32. Frame 26 may be laid on the ground or on the floor and includes a frame member 34 to which I attach spring wire members 36 in spaced relation to constitute a tee for the golf ball 32. Members 36 are provided with right-angular bends 38 fixedly anchored to the frame member 34. The tee supports the golf ball 32 in the elevated position of Fig. 12 for driving purposes.

A guide rod 40 has one end extending through a frame member 42 and is threaded for the reception of a nut 44. The opposite end of the rod 40 extends through the frame member 46 and is threaded for the reception of a nut 48. Rod 40 parallels the space 30 and is housed inside the same.

Golf ball 32 is bored to receive the runs 50 of a rawhide loop 52 which passes underneath the rod 40. The ends of the runs 50 are knotted at 54 to prevent withdrawal of the runs. Loop 52 is slidably related to the rod 40 so that the golf ball 32 may be driven in the direction of the arrow 56 of Figs. 5 and 12.

Frame 26 carries two uprights 58 to one of which I hingedly connect an impact member 60, as at 62. Impact member 60 extends transversely of the frame 26 and is provided with a rubber cushion 64 arranged in the path of the ball 32 when driven in the direction of the arrow 56. A metallic box 66 is mounted on the frame 26 and is secured thereto by screws 68. A switch lever 70 is rotatably mounted on a fixed shaft 72 adjacent a ratchet 74 fixedly related to a gear 76 rotatable on the shaft 72.

Figure 6:
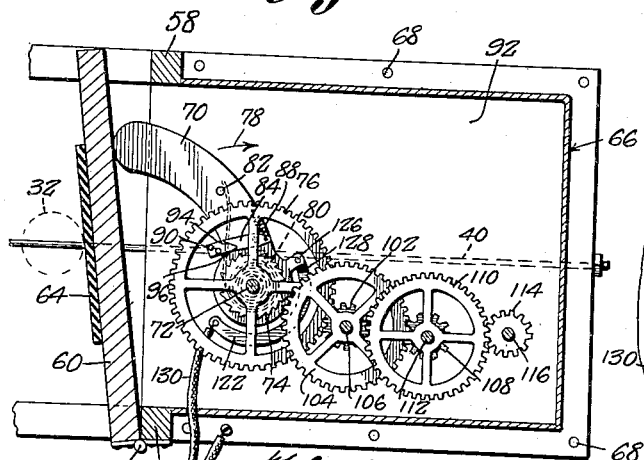
Figure 6 is a cross section plan view of the switch mechanism actuated by the impact member.

Switch arm 70 normally contacts the impact member 60, as illustrated in Fig. 6, so as to be driven in the direction of the arrow 78 when the golf ball 32 strikes the impact member. Switch arm 70 is yieldingly urged in the direction of the impact member 60 by reason of a spring 80 coiled about the shaft 72 with one end anchored to the shaft and its other end connected with a pin 82 carried by the switch arm.

The switch arm carries a pawl 84 pivoted at 86 to the switch arm and urged in the direction of the ratchet 74 by reason of a tension spring 88. A cam member 90 is in fixed relation to the floor 92 of the box 66, and is arranged in the path of the pawl 84. With the switch arm 70 positioned according to Fig. 6, the cam member 90 engages the angular face 94 on the pawl 84 and lifts the abutment 96 in the clear of the ratchet 74.

Figure 8:
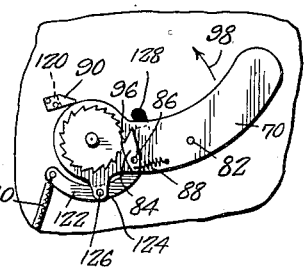
Figure 8 is a plan view of a portion of the switch mechanism of Figure 6.
Figure 7:
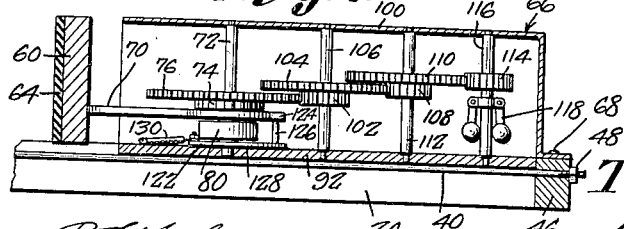
Figure 7 is a side view of the structure of Figure 6.

Abutment 96 is arranged to have latching relation with the teeth of the ratchet 74, as illustrated in Fig. 8. A slight movement of the switch arm 70 in the direction of the arrow 78 moves the pawl 84 out of camming relation with the cam 90, at which time the spring 88 urges the abutment 96 into latching relation with the teeth on the ratchet, so that movement of the switch arm 70 in the direction of the arrow 98 will impart rotation to the gear 76.

Shaft 72 has one end anchored in the floor 92 and its other end supported by the top wall 100 of the box 66. Gear 76 is arranged in mesh with a pinion 102 formed as an integral part with the gear 104 fixed to a shaft 106 having one end journaled in the floor 92 and its opposite end journaled in the top wall 100. Gear 104 is arranged in mesh with a pinion 108 integrally connected with a gear 110 fixed to a shaft 112 having one end journaled in the floor 92 and its opposite end journaled in the wall 100. Gear 110 is arranged in mesh with a pinion 114 keyed to the shaft 116 journaled in the floor 92 and the wall 100.

A governor 118 is associated with the shaft 116 for controlling the speed of the gear train connected with the ratchet 74. Governor 118 will regulate the speed at which time the switch arm 70 is returned to the normal position of Fig. 6. Cam 90 is carried by a bar 120 fixedly anchored to the floor 92, which bar is arranged in the path of the switch arm 70 to constitute an abutment for positioning the switch arm in the position of Fig. 6.

Upon the floor 92, I mount a curved contact strip 122 arranged in concentrical relation with the axis of the shaft 72. Switch arm 70 carries a projection 124 provided with a contact pin 126 arranged to have conducting relation with the strip 122. The strip 122 is provided with an insulated area 128 lying underneath the pin 126 in the normal position of the switch arm 70. Strip 122 may be insulated from the floor 92, as at 128.

A conductor 130 is connected with the contact strip 122, while a conductor 132' is electrically connected with the metallic box 66. It will thus be seen that the pin 126 on the switch arm 70 is electrically connected with the wire 132' through the medium of the box 66, the shaft 72 and the switch arm. Wire 132' could be attached directly to the pin, but the arrangement shown eliminates moving wires.

Upon the frame 132 of the panel 10, I mount an electric motor 134. Motor 134 drives a worm 136 arranged in mesh with a worm gear 138 fixed to a shaft 140 rotatably journaled in bearing 142. To the shaft 140 is fixedly connected a grooved wheel 144 for driving a belt 146 passing around the grooved wheel 148. Wheel 148 is keyed to a shaft 150 having one end rotatably journaled in a bar 152. Shaft 150 extends loosely through a relatively rotatable sleeve 154 which extends loosely through an opening 156 in the panel board 10.

Needle 16 is fixed to the sleeve 154, while the needle 18 is fixed to the shaft 150. One end of the sleeve 154 is fixedly connected with a gear 158 which is normally latched to the shaft 150 for rotation with the latter through the medium of a pawl 160. Pawl 160 is pivotally connected at 162 with a pin carried by a plate 164 fixedly related to the wheel 148. Pawl 160 includes an armature 166 which may be attracted upwardly by an electromagnet 168 carried by the bracket 170 constituting an extension of the plate 164.

Normally the sleeve 154 is latched to the shaft 150 because of the pawl 160. Sleeve 154, which operates the individual drive recording needle 16, may be rotated independently of the shaft 150 through energization of the electromagnet 168, which attracts the armature 166 upwardly and pivots the pawl 160 out of holding relation with the gear 158. Plate 164 carries a spring 170 which exerts pressure on the pawl 160 and urges the same into latching relation with the gear 158 upon deenergization of the electromagnet 168.

Rotation of the sleeve 154 independently of the shaft 150 is consummated through the medium of a weight 172 connected with a line 174 wound upon the sleeve 154. One end of the line 174 is attached to the sleeve 154 at such a point that the needle 16 will take the zero position 176 of Fig. 1 when the line is completely unwound.

Needles 16 and 18 are rotated in their counting directions through the medium of the motor 134. The circuit through the motor is closed through the impact of the golf ball 32 upon the impact member 69. The force of the impact determines the duration of the closed motor circuit, so that the distance traveled by the needles 16 and 18 will depend upon the force of the impact.

Needle 16 is reset to its zero position for each drive, while the totalizing needle 18 may be rotated by the motor in a counting direction in driving stages for a predetermined length of time, which period of time is controlled through the medium of a coin operated switch.

Wheel 148 carries two conducting plates 172' which are circular and concentrically related about the axis of the wheel. Conducting plates 172' are separated by insulation 174', and the plates are electrically connected with the electromagnet 168 through the medium of wires 176' and 178. Plates 172' rotate with the wheel 148, and spring contacts 180 bear against the plates.

Spring contacts 180 are insulated apart and mounted on a bracket 182 attached to the bar 152. One of the spring contacts 180 is connected with a wire 184, while the other contact 180 is connected with a wire 186. Wire 184 is connected with a switch 188 and a battery 190. Wire 186 is also connected with the battery 190 (see Fig. 11). Switch 188 is manually actuated for energizing the electromagnet 168.

In Fig. 5, I illustrate the switch 188 as being mounted on the frame 26 in close proximity to the tee comprising the spring wires 36. The spaced terminals 192 are arranged to be bridged by a flexible switch member 194 by pressing the same downwardly. Member 194 may be depressed by the foot or the golf club after each drive for energizing the electromagnet 168 to return the needle 16 to its zero position 176.

To the frame 132 of the panel 10 is secured a coin chute 196 communicating with a horizontal coin guide 198. Coin guide 198 is flat for supporting the coin 200 on edge as it drops into the guide. Each side of the guide carries a spring finger 202 for gripping and supporting the coin 200 in the position of the Fig. 10. Guide 198 loosely supports a head 204 connected with a push rod 206 actuated through the medium of a knob 208.

Push rod 206 is loosely supported in an opening in the frame 132 and is provided with a flange 210 against which one end of a compression spring 212 bears. Spring 212 encircles the push rod and has its opposite end in abutting relation with the guide 198 so as to normally support the head 204 in the position of Fig. 2.

Upon the wall 214 of a coin receptacle 216 I mount an arm 216 which carries a mercury switch 218. Arm 216 is pivotally connected at 220 with the wall 214. The wire 132' and a wire 222 are electrically related to the mercury switch 218 and are arranged to be bridged when the switch is moved to the full line position of Fig. 10. The circuit is broken when the arm 216 is moved to the dotted line position. Coin 200 moves the arm 216 from its normal or dotted line position of Fig. 10 to the full line position illustrated therein.

Wall 214 carries a kicker arm 228 for driving the coin 200 from the position of Fig. 10 into the receptacle 216. Arm 228 is pivotally mounted on a pin 230. A coiled spring 232 has one end fixedly connected with the pin 230 and its other end hooked over a pin 234 attached to the kicker arm 228 for urging the end 236 downwardly. End 236 may be provided with a right-angular bend 238 for striking the coin. A pin 240 limits the downward movement of the end 236, and a pin 242 constitutes a rest for the arm 216 when lying in its normal position.

In the absence of the coin 200, arm 216 normally lies in the dotted line position of Fig. 10, at which time its short end lies in the dotted line position, as indicated at 244. At the same time, the end 236 of the kicker arm 228 lies in the dotted line position of Fig. 10, as indicated at 246. A coin dropped in the chute 196 will lie in the guide 198. As the head 204 is advanced, the coin is pushed forwardly to the position indicated in Fig. 10. During such advancement of the coin 200 the end 236 will be moved from the dotted line position to its full line illustration, while the short end of the arm 216 will be pivotally downwardly for moving the arm to the full line position, at which time the mercury in the tube will bridge the wires 222 and 132. The machine is then ready for operation.

Wheel 148 carries a finger 248 arranged in the path of the end 250 of the kicker arm 228. Finger 248 normally lies underneath the end 250, as illustrated at 252 in Fig. 10. Coin 200 will remain in the position of Fig. 10 until the wheel 148 has made a complete revolution. Figs. 2 and 10 illustrate the wheel about to complete its revolution. As wheel 148 is rotated in the direction of the arrow 254, the finger 248 will engage the end 250 of the kicker arm 228 and pivot the end downwardly. Finger 248 will then pass the end 250 at which time the spring 232 will kick the end 236 downwardly for kicking the coin 200 into the receptacle 216. With the coin 200 removed, the mercury switch 218 will drop to its normal position, while the kicker arm 228 will also take the dotted line position of Fig. 10.

Referring to Fig. 11, the wire 132' is electrically related to the contact pin 126. Wire 130, connected with the contact strip 122, connects with the secondary winding 260 of a transformer 262. Primary winding 264 of the transformer 262 is connected with line wires 266 and 268. A wire 270 connects with the wire 266 and leads to the motor 134, while a wire 272 leads from the motor and connects with a contact 274. An armature 276 is arranged to be attracted by the energized relay 256 and carries a contact 278 electrically engaging the contact 274 when the relay 256 is energized. Line wire 268 connects with the contact 278, and a wire 258 connects the secondary winding 260 with the relay 256, with the wire 222 leading from the mercury switch 218 to the relay. Wire 132' electrically connects the contact strip 122 with the mercury switch 218.

From the foregoing description of the various parts of the device, the operation thereof will be readily understood. The deposit of a coin of predetermined denomination in the chute 196 will close the switch 218 when the coin is advanced to the full line illustration of Fig. 10. When the mercury switch 218 is closed, the circuit through the motor will be closed only when the pin 126 is moved into conducting relation with the contact strip 122.

With the pin 126 contacting the strip 122, the relay 256 will be energized for drawing the armature 276 to the position of Fig. 11, at which time the contact 274 is arranged in conducting relation with the contact 278. The circuit through the motor will then be closed. Motor 134 will operate so long as the pin 126 is in contact with the strip 122. The duration of contact between the pin 126 and the strip 122 will depend upon the force with which the golf ball 32 strikes the impact member 60.

Operation of the motor 134 will turn the needles 16 and 18 in a counter-clockwise direction when viewing Fig. 1. Thus the force with which the golf ball strikes the impact member 60 will be translated in terms of yardage, as indicated by the dials 12 and 14. After each drive, the switch 188 is closed which energizes the electromagnet 168 for drawing the pawl 160 out of latching relation with the gear 158. Thus the needle 16 will return to its zero position after each drive.

During rotation of the wheel 148, the finger 248 will pivot the kicker arm 228 to permit the arm to kick the coin 200 out of holding relation with the mercury switch 218. It will thus be seen that I have provided a device through the medium of which individual drives may be translated in terms of yardage, in addition to providing means whereby a series of drives may be recorded in terms of total yardage. The number of drives required to rotate the wheel 148 a complete revolution will depend upon the forces of the individual drives. After completion of one revolution of the wheel, the machine may again be rendered operable by depositing another coin.

I claim:

1. A golf practicing device comprising an impact totalizing means, an individual drive impact indicator means, a motor, an operating connection between the motor and the impact totalizing means, latch means for operatively connecting the individual drive impact indicator means with the impact totalizing means, electrical means for unlatching said latch means including a manually actuated switch, means for returning the individual drive impact indicator means to a starting position upon unlatching of said latch means, and a circuit connected with said motor including a golf ball impact switch.

2. A golf practicing device, the combination of a rotatable shaft having a totalizing needle connected therewith, an electric motor having an operating connection with said shaft for rotating the latter, shaft means coaxially related to said first shaft and having an individual drive needle connected therewith, said shaft means being rotatable relatively to said first shaft and having a toothed latch member fixedly connected therewith, a support connected with said first shaft for rotation therewith, a pawl movably mounted on said support and normally engaging said latch member to connect said first shaft and said shaft means as a unit, an electro-magnet mounted on said support for pulling said pawl out of engagement with said latch member, weight means connected with said shaft means for rotating the latter when said pawl is moved out of engagement with said latch member to move the individual drive needle to its zero position, an electric circuit connected with said motor and including an impact actuated switch for energizing the motor to rotate said first shaft and said shaft means as a unit, and an electric circuit including a manually actuated switch for energizing said electro-magnet to move said pawl out of engagement with said latch member.

3. A golf practicing device, the combination of a rotatable shaft having a totaling needle connected therewith, an electric motor having an operating connection with said shaft for rotating the latter, shaft means coaxially related to said first shaft and having an individual drive needle connected therewith, said shaft means being rotatable relatively to said first shaft and having a toothed latch member fixedly connected therewith, a support connected with said first shaft for rotation therewith, a pawl movably mounted on said support and normally engaging said latch member to connect said first shaft and said shaft means as a unit, an electro-magnet mounted on said support for pulling said pawl out of engagement with said latch member, weight means connected with said shaft means for rotating the latter when said pawl is moved out of engagement with said latch member to move the individual drive needle to its zero position, an electric circuit connected with said motor and including an impact actuated switch for energizing the motor to rotate said first shaft and said shaft means as a unit, an electric circuit including a manually actuated switch for energizing said electro-magnet to move said pawl out of engagement with said latch member, a coin controlled switch interposed in said first mentioned electric circuit, and means coacting with said first shaft for shifting said coin controlled switch to an open position upon a complete revolution of said first shaft.

4. A golf practicing device, the combination of a rotatable shaft having a totalizing needle connected therewith, an electric motor having an operating connection with said shaft for rotating the latter, shaft means coaxially related to said first shaft and having an individual drive needle connected therewith, said shaft means being rotatable relatively to said first shaft and having a toothed latch member fixedly connected therewith, a support connected with said first shaft for rotation therewith, a pawl movably mounted on said support and normally engaging said latch member to connect said first shaft and said shaft means as a unit, an electro-magnet mounted on said support for pulling said pawl out of engagement with said latch member, weight means connected with said shaft means for rotating the latter when said pawl is moved out of engagement with said latch member to move the individual drive needle to its zero position, an electric circuit connected with said motor and including an impact actuated switch for energizing the motor to rotate said first shaft and said shaft means as a unit, an electric circuit including a manually actuated switch for energizing said electro-magnet to move said pawl out of engagement with said latch member, said operating connection including a motor driven wheel, a wheel fixedly related to said first shaft and a coupling member connecting the two wheels, a coin controlled switch interposed in said first mentioned electric circuit including means for holding a coin coacting with the coin controlled switch for holding the latter in a closed position, and means carried by the wheel connected with said first mentioned shaft for removing the coin upon a predetermined degree of rotation of said first mentioned shaft for opening said coin controlled switch.

TURNER C. RUSH.